United States Patent
Henkel et al.

(10) Patent No.: US 11,700,181 B2
(45) Date of Patent: Jul. 11, 2023

(54) TOPOLOGY COMPILER FOR NETWORK MANAGEMENT SYSTEM

(71) Applicant: Juniper Networks, Inc., Sunnyvale, CA (US)

(72) Inventors: Michael Henkel, Saratoga, CA (US); Atul S Moghe, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/305,118

(22) Filed: Jun. 30, 2021

(65) Prior Publication Data

US 2023/0006885 A1    Jan. 5, 2023

(51) Int. Cl.
*H04L 41/12* (2022.01)
*H04L 41/082* (2022.01)
*H04L 41/08* (2022.01)
*H04L 41/0853* (2022.01)

(52) U.S. Cl.
CPC ............ *H04L 41/12* (2013.01); *H04L 41/082* (2013.01); *H04L 41/0853* (2013.01); *H04L 41/0883* (2013.01)

(58) Field of Classification Search
CPC ... H04L 41/12; H04L 41/082; H04L 41/0853; H04L 41/0883
See application file for complete search history.

(56) References Cited

U.S. PATENT DOCUMENTS

| 10,200,248 | B1 | 2/2019 | Jiang et al. | |
| 10,516,761 | B1 | 12/2019 | A et al. | |
| 10,551,431 | B1 * | 2/2020 | Yang | G01R 31/2858 |
| 11,088,900 | B2 * | 8/2021 | Ratkovic | H04L 41/0803 |
| 2005/0015236 | A1 * | 1/2005 | Wain | G06F 8/41 704/1 |
| 2018/0210927 | A1 * | 7/2018 | Karam | G06F 16/9024 |
| 2020/0106675 | A1 * | 4/2020 | Sirton | H04L 41/22 |

(Continued)

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.

(Continued)

*Primary Examiner* — Tonia L Dollinger
*Assistant Examiner* — Joseph M Cousins
(74) *Attorney, Agent, or Firm* — Shumaker & Sieffert, P.A.

(57) ABSTRACT

An example controller device that manages a plurality of network devices includes one or more processing units implemented in circuitry and configured to receive, via an application programming interface (API) framework, an indication of an intent. The intent includes data indicating an update to a data structure including a plurality of nodes representing the plurality of network devices and a plurality of edges connecting the plurality of nodes. The one or more processing units are further configured to process the intent to select a topology compiler from a plurality of topology compilers and invoke, via the API framework, the selected topology compiler using a role of a network device of the plurality of network devices and an indication of the network device as input to generate abstract configuration information. The one or more processing units are further configured to configure the network device based on the abstract configuration information.

20 Claims, 10 Drawing Sheets

(56) References Cited

U.S. PATENT DOCUMENTS

2021/0144072 A1   5/2021  A et al.
2021/0373860 A1* 12/2021  Khan ..................... G06F 9/546

OTHER PUBLICATIONS

Harrington et al., "An Architecture for Describing Simple Network Management Protocol (SNMP) Management Frameworks," Network Working Group, RFC 3411, Dec. 2002, 64 pp.

Enns, "NETCONF Configuration Protocol," Network Working Group, RFC 4741, Dec. 2006, 95 pp.

Extended Search Report from counterpart European Application No. 22178230.3 dated Nov. 8, 2022, 10 pp.

Hart, "Intent Framework", ONOS—Wiki, May 2016, 3 pp., Retrieved from the Internet on Mar. 28, 2022 from URL: https://wiki.onosproject.org/display/ONOS/Intent+Framework.

Thomas, "Basic ONOS Tutorial", Feb. 2019, 24 pp., Retrieved from the Internet on Oct. 28, 2022 from URL: https:/wiki.onosproject.org/display/ONOS/Basic+ONOS+Tutorial.

\* cited by examiner

TOPOLOGY COMPILER FOR NETWORK MANAGEMENT SYSTEM

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator can easily create and manage these high-level network configuration services.

In particular, user configuration of devices may be referred to as "intents." An intent-based networking system lets administrators describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When Intents are modeled using a unified graph model, extending new intent support needs to extend the graph model and compilation logic.

In order to configure devices to perform the intents, a user (such as an administrator) may write translation programs that translate high-level configuration instructions (e.g., instructions according to an intent data model, which may be expressed as a unified graph model) to low-level configuration instructions (e.g., instructions according to a device configuration model). As part of configuration service support, the user/administrator may provide the intent data model and a mapping between the intent data model to a device configuration model.

In order to simplify the mapping definition for the user, controller devices may be designed to provide the capability to define the mappings in a simple way. For example, some controller devices provide the use of Velocity Templates and/or Extensible Stylesheet Language Transformations (XSLT). Such translators contain the translation or mapping logic from the intent data model to the low-level device configuration model. Typically, a relatively small number of changes in the intent data model impact a relatively large number of properties across device configurations. Different translators may be used when services are created, updated, and deleted from the intent data model.

SUMMARY

In general, this disclosure describes techniques for managing network devices. A network management system (NMS) device, also referred herein as a controller or controller device, may be configured to translate high-level configuration (intents received from an administrator for a plurality of managed network devices) to low-level configuration (to be applied to the managed network devices themselves). In some instances, the controller device may receive an indication of a topology and a role for a resource device and generate device-level configuration information for the resource device. For example, an administrator (e.g., a human being) may select a topology (e.g., spine or leaf, 3-stage Clos, or 5-stage Clos) and role for the resource device and provide an intent. In some examples, the controller device may generate device-level configuration for the resource device based on the role of the resource device, the topology, and the intent. In some instances, intents provided by the administrator to the controller device may be associate with many (e.g., more than 10, more than 20, etc.) roles. As the number of roles increases, a complexity of operating the controller device increases, which may result in an administrator assigning an incorrect role or topology to a resource device such that the controller device is not able to correctly implement the intent.

According to the techniques of this disclosure, the controller device may support a plurality of topology compilers, where each topology compiler is associated with a respective topology. For example, a first topology compiler may be associated with a 3-stage Clos network and a second topology compiler may be associated with a 5-stage Clos network. Rather than relying on an administrator to assign a role to each resource device, the topology compiler may be configured to assign the rule to each resource device. In this way, setting up a fabric using a topology may be implemented with less interaction from the administrator, which may improve a reliability of the fabric.

Moreover, rather than relying on a set of instructions for all topologies, each resource device supporting a topology may invoke the respective topology compiler assigned to the topology. For example, a first resource device may invoke a 3-state Clos network topology compiler along with an indication of the role of the first resource device, and the 3-stage Clos network topology compiler may generate an abstract configuration for the first resource device. In this example, the first resource device may generate device-level configuration information to configure the first resource device to implement the intent provided by the administrator. In this way, a resource controller for the resource device may auto-generate the necessary configuration information in view of the chosen topology, which may reduce a time for configuring resource devices to implement an intent.

Further, the controller device may implement an "extensible framework" that may permit one or more additional topology compilers while maintaining a common framework. In this way, the controller device may be configured to support a new topology while operating existing topologies at runtime and without modifying framework for the existing topologies.

In one example, a method includes receiving, by a controller device that manages a plurality of network devices, via an application programming interface (API) framework, an indication of an intent. The intent includes data indicating an update to a data structure including a plurality of nodes representing the plurality of network devices and a plurality of edges connecting the plurality of nodes. The method further includes processing, by the controller device, the intent to select a topology compiler from a plurality of topology compilers and invoking, by the controller device, via the API framework, the selected topology compiler using a role of a network device of the plurality of network devices and an indication of the network device as input to generate abstract configuration information. The method further includes configuring, by the controller device, the network device based on the abstract configuration information.

In another example, a controller device that manages a plurality of network devices includes one or more processing units implemented in circuitry and configured to receive, via an application programming interface (API) framework, an indication of an intent. The intent includes data indicating an update to a data structure including a plurality of nodes representing the plurality of network devices and a plurality of edges connecting the plurality of nodes. The one or more processing units are further configured to process the intent to select a topology compiler from a plurality of topology compilers and invoke, via the API framework, the selected topology compiler using a role of a network device of the plurality of network devices and an indication of the network device as input to generate abstract configuration information. The one or more processing units are further configured to configure the network device based on the abstract configuration information.

In one example, a computer-readable storage medium having stored thereon instructions that, when executed, causes a processor of a controller device that manages a plurality of network devices to receive, via an application programming interface (API) framework, an indication of an intent. The intent includes data indicating an update to a data structure including a plurality of nodes representing the plurality of network devices and a plurality of edges connecting the plurality of nodes. The instructions further cause the processor to process the intent to select a topology compiler from a plurality of topology compilers and invoke, via the API framework, the selected topology compiler using a role of a network device of the plurality of network devices and an indication of the network device as input to generate abstract configuration information. The instructions further cause the processor to configure the network device based on the abstract configuration information.

The details of one or more examples are set forth in the accompanying drawings and the description below. Other features, objects, and advantages will be apparent from the description and drawings, and from the claims.

DETAILED DESCRIPTION

Figure 1:
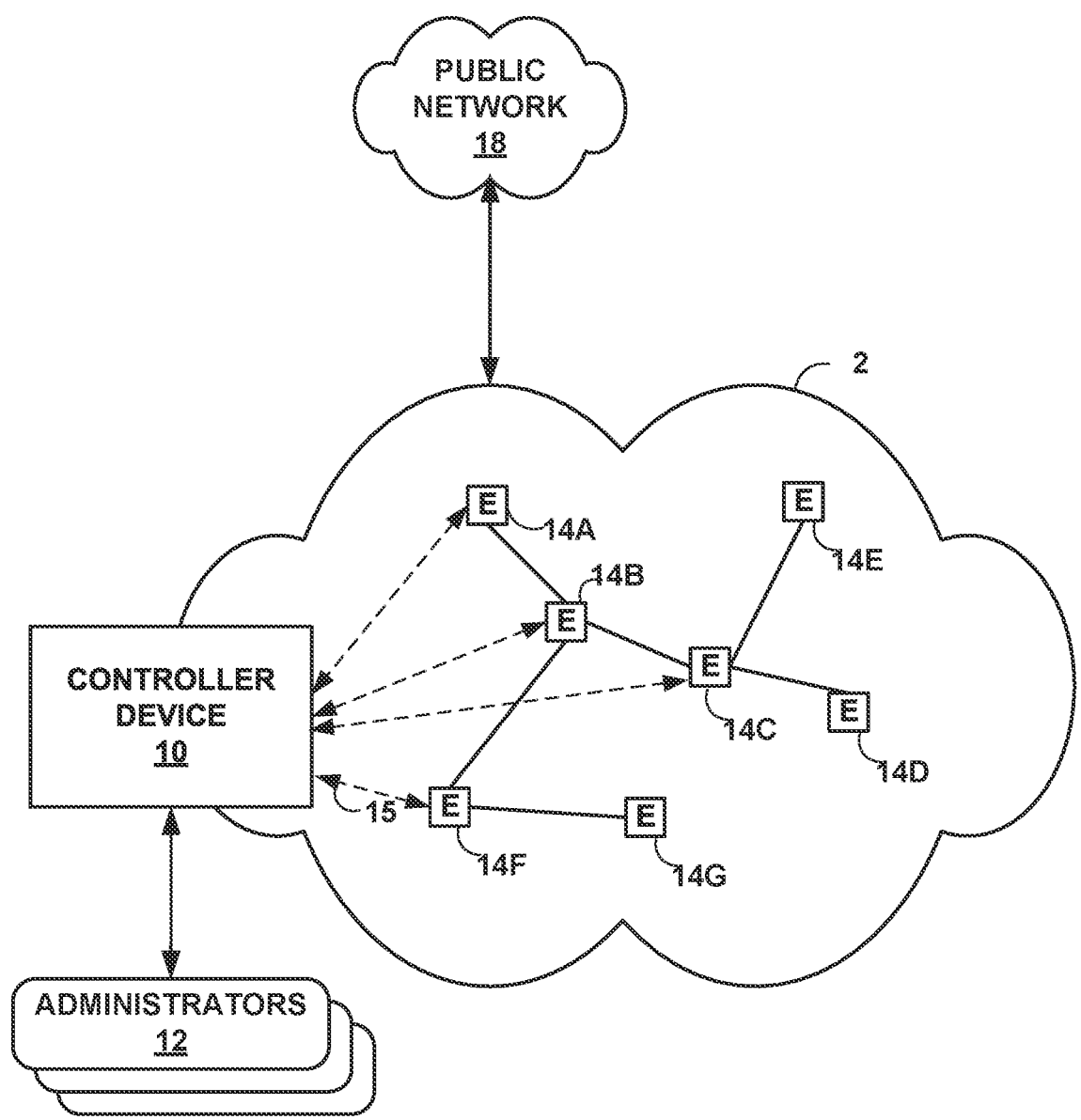
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force. RFC 6020, October 2010, available at tools.ietf.org/html/rfc6020). Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (i.e., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE." U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks. Intents are declarative. To realize intents, controller device 10 attempts to select optimal resources.

In general, controller device 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent. In some instances, intents provided by administrator 12 to controller device 10 may be associate with many (e.g., more than 10, more than 20, etc.) of roles. As the number of roles increases, a complexity of operating the controller device increases, which may result in administrator 12 assigning an incorrect role or topology to a resource device such that controller device 10 is not able to correctly implement the intent.

According to the techniques of this disclosure, controller device 10 may support a plurality of topology compilers, where each topology compiler is associated with a respective topology. For example, a first topology compiler may be associated with a 3-stage Clos network and a second topology compiler may be associated with a 5-stage Clos network. Rather than relying on administrator 12 to assign a role to each resource device, the topology compiler may be configured to assign the rule to each resource device. In this way, setting up a fabric using a topology may be implemented with less interaction from the administrator, which may improve a reliability of the fabric.

Moreover, rather than relying on a set of instructions for all topologies, each of elements 14 may invoke the topology compiler assigned to the topology. For example, element 14A may invoke a 3-state Clos network topology compiler along with an indication of the role of the first resource device, and the 3-stage Clos network topology compiler may generate an abstract configuration for the first resource device. In this example, element 14A may generate device-level configuration information to configure element 14A to implement the intent provided by administrator 12. In this way, controller device 10 may auto-generate configuration information in view of the chosen topology, which may reduce a time for configuring resource devices to implement an intent.

Further, controller device 10 may implement an "extensible framework" that may permit one or more additional topology compilers while maintaining a common framework. In this way, controller device 10 may be configured to support a new topology while operating existing topologies at runtime and without modifying framework for the existing topologies. For instance, each of the topology compilers may comprise pluggable topology compilers configurated to conform to a standard invocable by the extensible framework (e.g., an application programming interface (API) framework).

For example, controller device 10 may receive an indication of an intent. In some examples, the intent includes data indicating an update to a data structure including a plurality of nodes representing elements 14 and a plurality of edges connecting the plurality of nodes. Controller device 10 may process the intent to select a topology compiler from a plurality of topology compilers. For example, controller device 10 may select a topology of a plurality of topologies for the elements 14 based on the intent and connectivity information of elements 14. In this example, controller device 10 may select the topology compiler that is associated with (e.g., assigned to) the selected topology.

Controller device 10 may invoke, via the API framework, the topology compiler using a role of element 14A and an indication of element 14A as input to generate abstract configuration information. In this example, controller device 10 may configure element 14A based on the abstract configuration information. In this way, controller device 10 may auto-generate configuration information in view of the chosen topology, which may reduce a time for configuring resource devices to implement an intent. Moreover, using the API framework may comprise an extensible framework, which may allow the plurality of compilers conforming to a standard invocable by the extensible framework to be modified at runtime such that new topology compilers may be added and existing topology compilers can be removed. In this way, controller device 10 may be modified at runtime, which may reduce a downtime of network 2.

Figure 2:
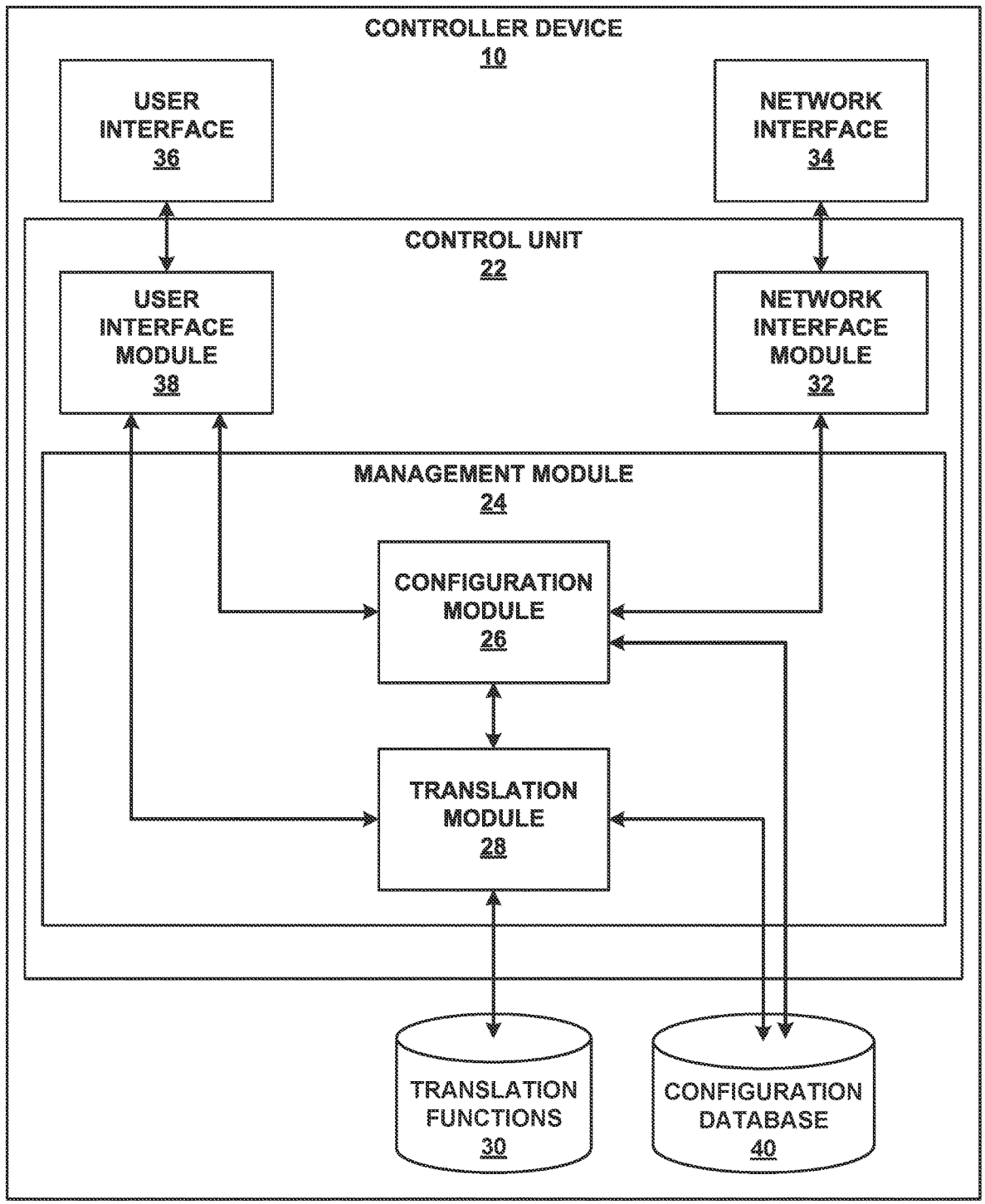
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive intents (e.g., high-level configuration instructions) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 generally includes information describing managed network devices, e.g., elements 14. For example, configuration database 40 may include information indicating device identifiers (such as MAC and/or IP addresses), device type, device vendor, devices species (e.g., muter, switch, bridge, hub, etc.), or the like. Configuration database 40 also stores device-level configuration information based on intents (e.g., high-level configuration information, or in some cases, both high-level configuration and low-level configuration information) for the managed devices (e.g., elements 14).

Translation module 28, which may also be referred to herein as a "device manager," may determine which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with controller device 10, it should be understood that other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Figure 3:
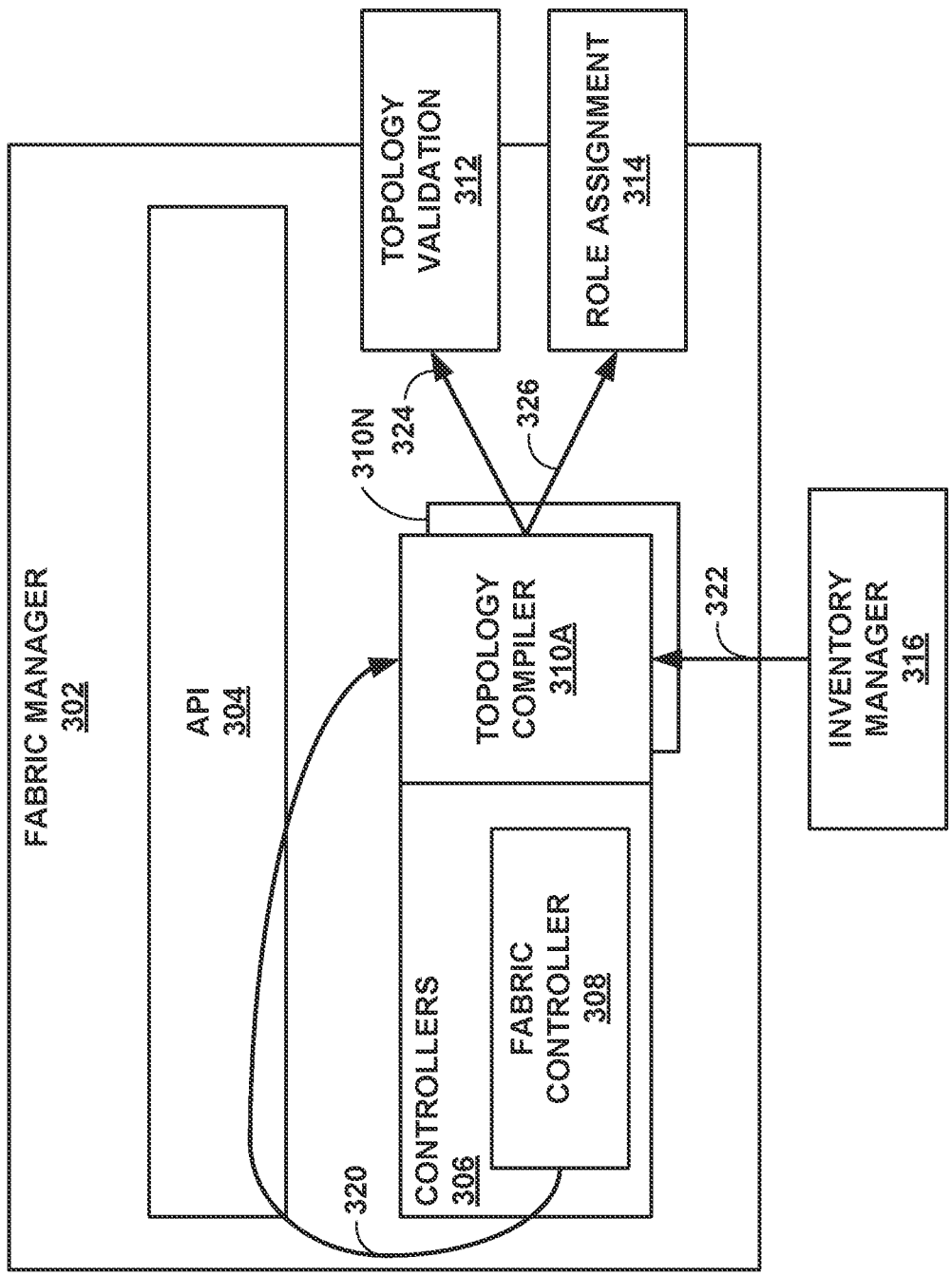
FIG. 3 is a conceptual diagram illustrating example assignment of roles to elements in accordance with the techniques of this disclosure.

FIG. 3 is a conceptual diagram illustrating example assignment of roles to elements 14 in accordance with the techniques of this disclosure. Fabric manager 302 includes API framework 304 (also referred to herein as simply "API 304"), controllers 306, which includes fabric controller 308, topology compilers 310A-310n (collectively, "topology compilers 301"), topology validation 312, role assignment 314, and inventory manager 316. Inventory manager 316 may access configuration database 40 of FIG. 2 to determine connectivity information.

In the example of FIG. 3, fabric controller 308 may call topology compiler 310A with an indication of element 14A as input (320). For example, fabric controller 308 may select topology compiler 310A from topology compilers 310 based on an intent indicating a change to a topology associated with (e.g., assigned to) topology compiler 310A. In this example, fabric controller 308 may invoke, via API 304, topology compiler 310A. For instance, fabric controller 308 may invoke, via a standard invokable by API 304, topology compiler 310A.

Topology compiler 310A may read connectivity information (e.g., link and/or cabling information) from inventory manager 316 (316). Topology compiler 310A may validate the user requested topology based on the provided topology type and elements 14. For instance, topology compiler 310A may, when executed by fabric controller 308, compare the connectivity information from inventory manager 316 with valid connectivity information for the provided topology type.

Topology compiler 310A may assign topology specific roles to elements 14. For example, topology compiler 310A may include a binary that when executed by fabric controller 308 assigns a spine or leaf role to element 14A based on the connectivity information. For instance, topology compiler 310A may, when executed by fabric controller 308, assign a spine role to element 14A in response to the connectivity information indicating that element 14A is cabled as a spine in a spine and leaf topology.

Figure 4:
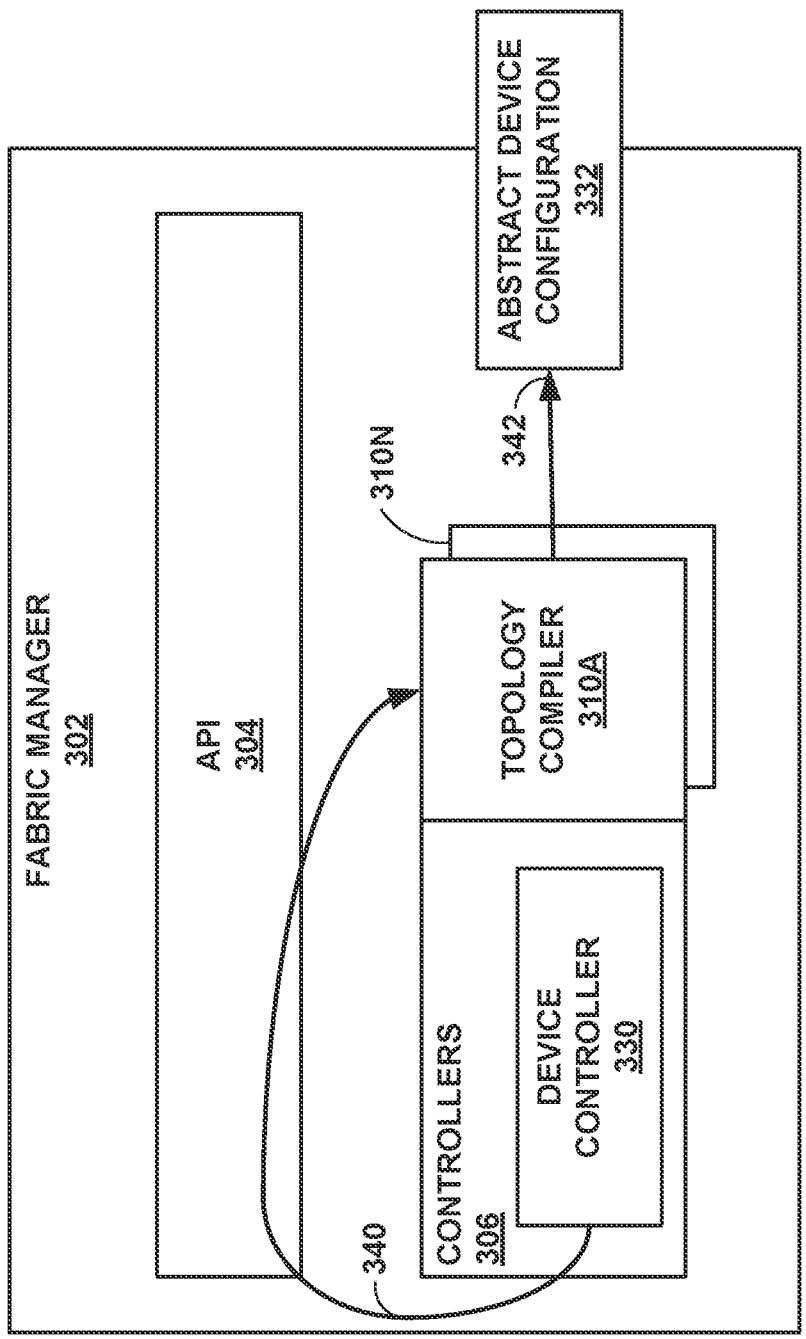
FIG. 4 is a conceptual diagram illustrating example of generating an abstract device configuration for a resource device in accordance with the techniques of this disclosure.

FIG. 4 is a conceptual diagram illustrating an example of generating an abstract device configuration 332 for a resource device in accordance with the techniques of this disclosure. Fabric manager 302 includes API 304, controllers 306, which includes fabric controller 308, topology compilers 310, and abstract device configuration 332.

In the example of FIG. 4, fabric controller 308, via API 304, may call a topology compiler of topology compliers 310 with a device resource, including the roles, as input (340). For instance, fabric controller 308, via API 304, may call topology complier 310A with an indication of element 14A, including a roles (e.g., leaf or spine), as input. Based on the role and the topology associated with topology compiler 310A, fabric controller 308, when executing topology compiler 310A, may create abstract device configuration 332 (342). For instance, fabric controller 308, when executing topology compiler 310A, may create abstract device configuration 332 for element 14A based on the role of element 14A. The abstract device configuration 332 may comprise an OpenConfig instructions on a per device basis (e.g., per element of elements 14A).

Figure 5:
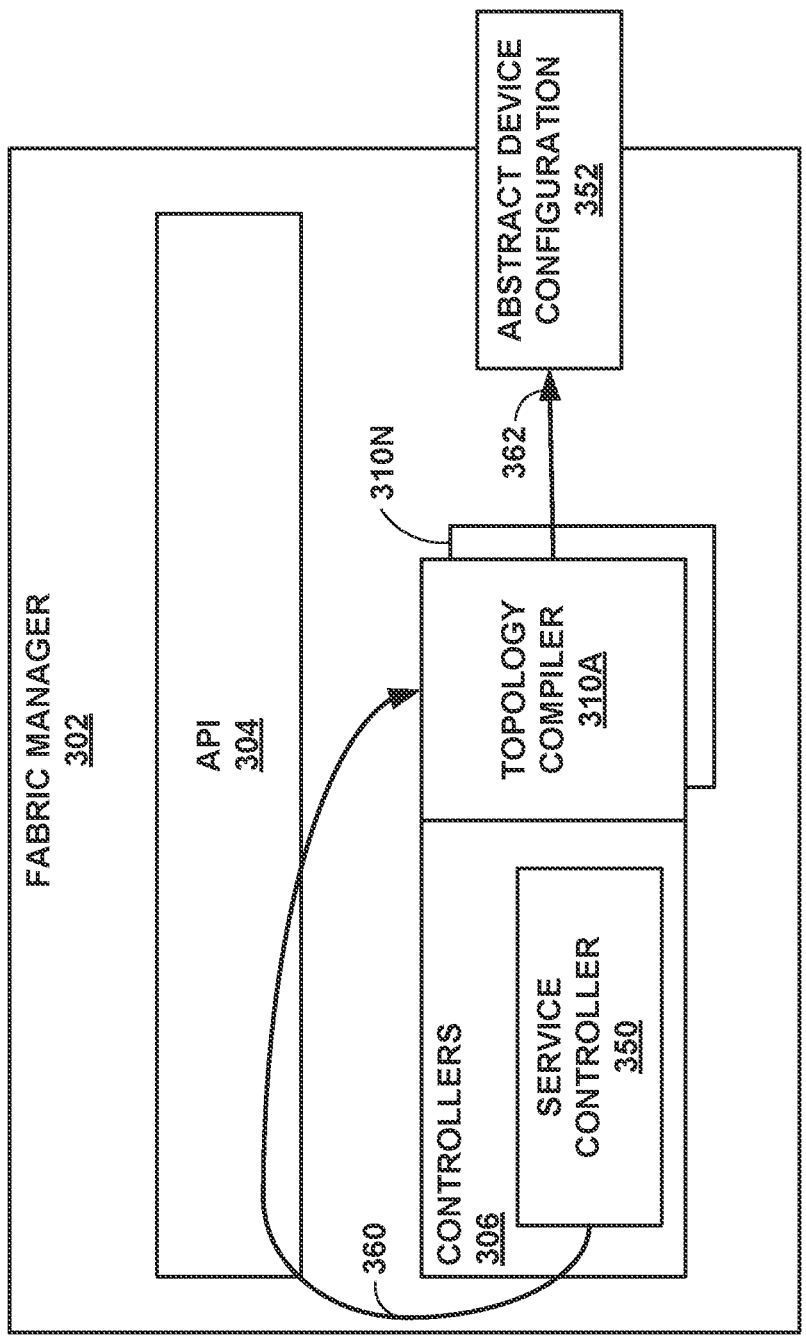
FIG. 5 is a conceptual diagram illustrating example of generating an abstract device configuration for a service device in accordance with the techniques of this disclosure.

FIG. 5 is a conceptual diagram illustrating an example of generating an abstract device configuration 352 for a service resource in accordance with the techniques of this disclosure. Fabric manager 302 includes API 304, controllers 306, which includes service controller 350, topology compilers 310, and abstract device configuration 332.

In the example of FIG. 5, service controller 350, with API 304, may call a topology compiler of topology compliers 310 with a service resource, including the roles, as input (360). For instance, service controller 350, via API 304, may call topology complier 310A with an indication of a service resource, including a roles, as input. Based on the role and the topology associated with topology compiler 310A, service controller 350, when executing topology compiler 310A, may create abstract device configuration 352 (362). For instance, service controller 350, when executing topology compiler 310A, may create abstract device configuration 352 for a service resource based on the role of the service resource. The abstract device configuration 352 may comprise an OpenConfig instructions on a per service resource basis.

Figure 6:
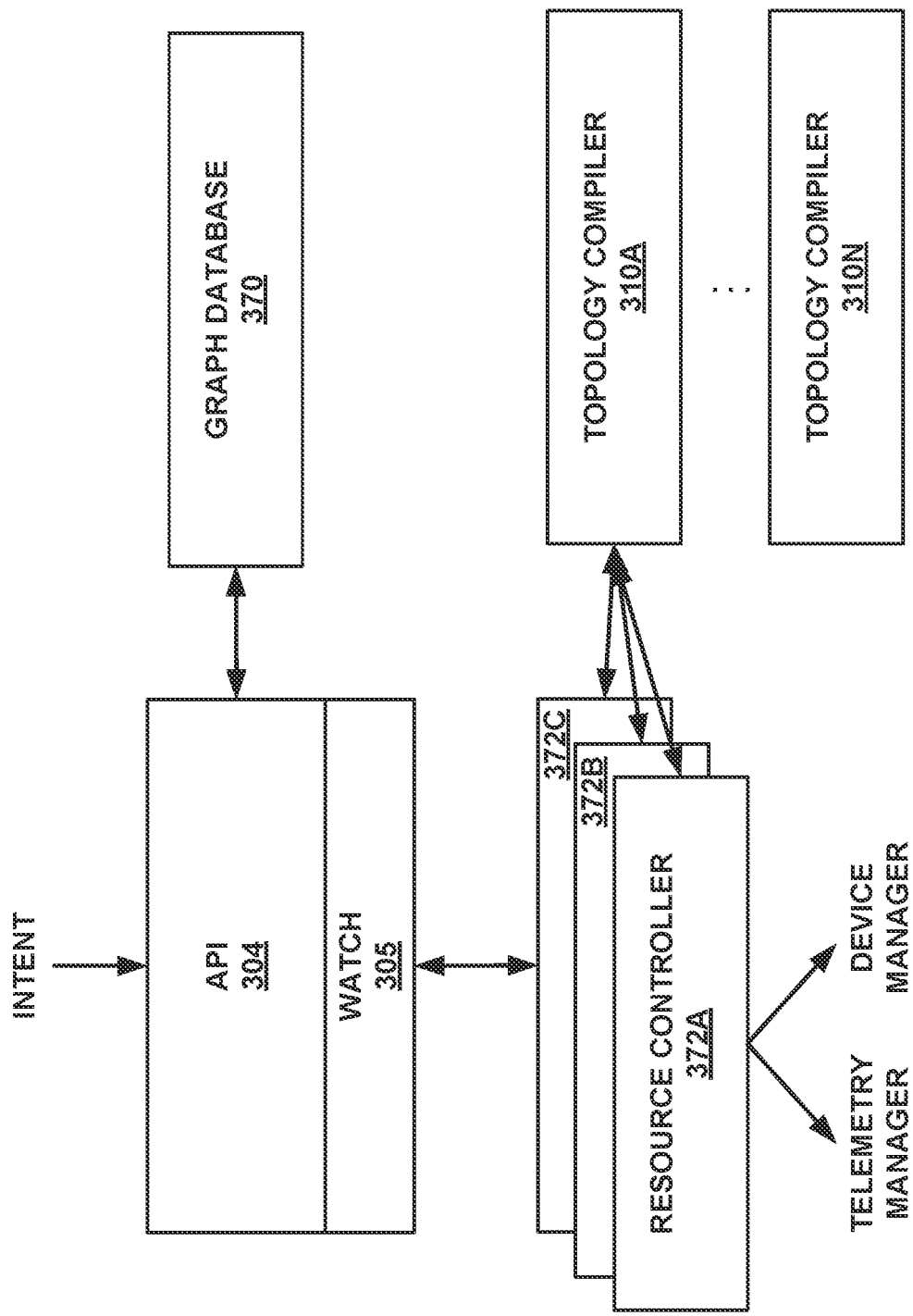
FIG. 6 is a conceptual diagram illustrating example of generating a device-level configuration in accordance with the techniques of this disclosure.

FIG. 6 is a conceptual diagram illustrating example of generating a device-level configuration in accordance with the techniques of this disclosure. In the example of FIG. 6, topology compilers 310 may use API 304 when transforming an intent into an abstract device configuration. Resource controllers 372A-372C (collectively, "resource controllers 372") may be configured for topology awareness. For instance, resource controller 372A may determine a topology implemented by resource controller 372A and invoke a topology compiler of topology compilers 310 that is associated with the topology implemented by resource controller 372A. In some examples, a telemetry manager may output telemetry information to each of the resource controllers 372. A device manager may convert an abstract configuration into a device-level configuration. In some examples, the device manager may comprise translation module 28 of FIG. 2 and/or may be configured to perform one or more functions of translation module 28.

Resource controllers 372 may be configured to provide semantic translation of intent resources to abstract configuration based on topology. For instance, resource controller 372A may invoke topology compiler 310A that is associated with the topology implemented by resource controller 372A to translate the intent into an abstract configuration.

Resource controllers 372 may be configured to support multiple topology compilers 372. For instance, resource controller 372A may select one of topology compilers 310 that is associated with the topology implemented by resource controller 372A. In some examples, topology compilers 310 may be pluggable. For example, each topology compiler of topology compilers 310 may comprise a pluggable compiler configured to conform to a standard invocable by the API 304. For instance, API 304 may comprise a set of communication standards for providing intent information to topology compilers 310 and may comprise a set of communication standards for receiving an abstract configuration. In this way, a new topology compiler may be added to topology compilers 310 at runtime.

Resource controllers 372 may be topology agnostic. For example, resource controller 372A may send an abstract configuration to a device manager (e.g., translation module 28). In this example, the device manager may translate the abstract into a device-level configuration.

In the example of FIG. 6, processing circuitry (e.g., processing circuitry of controller device 10), may generate, via API 304, one or more change events for resource controllers 372 using an intent as an input. For example, the processing circuitry (e.g., processing circuitry of controller device 10) may generate the one or more change events for resource controllers 372 based on the intent and further based on a data structure (e.g., a graph model) stored in graph database 370.

Resource controllers 372A may determine whether a change event has occurred for resource controller 372A. For instance, a watch function 305 (also referred to herein as simply "watch 305") may indicate, via API 304, whether a change event has occurred for each of resource controllers 372A. Resource controller 372A may determine a topology compiler from topology compilers 310 based on the one or more change events. For example, resource controller 372A may determine topology compiler 310A is associated with the one or more change events based on a portion of a data structure stored by graph database 370. In this example, resource controller 372A may invoke, via API 304, topology compiler 310A using a role of element 14A and an indication of element 14A as input to generate abstract configuration information. In this example, topology compiler 310, when executed by processing circuitry (e.g., processing circuitry of controller device 10), may output the abstract configuration information to resource controller 372A.

Resource controller 372A may configure element 14A based on the abstract configuration information. Resource controller 372A may configure element 14A based on the abstract configuration. In some examples, resource controller 372A may output the abstract configuration to the device manager and may receive a device-level configuration. In some examples, resource controller 372A may determine the device-level configuration based on the abstract configuration.

Figure 7:
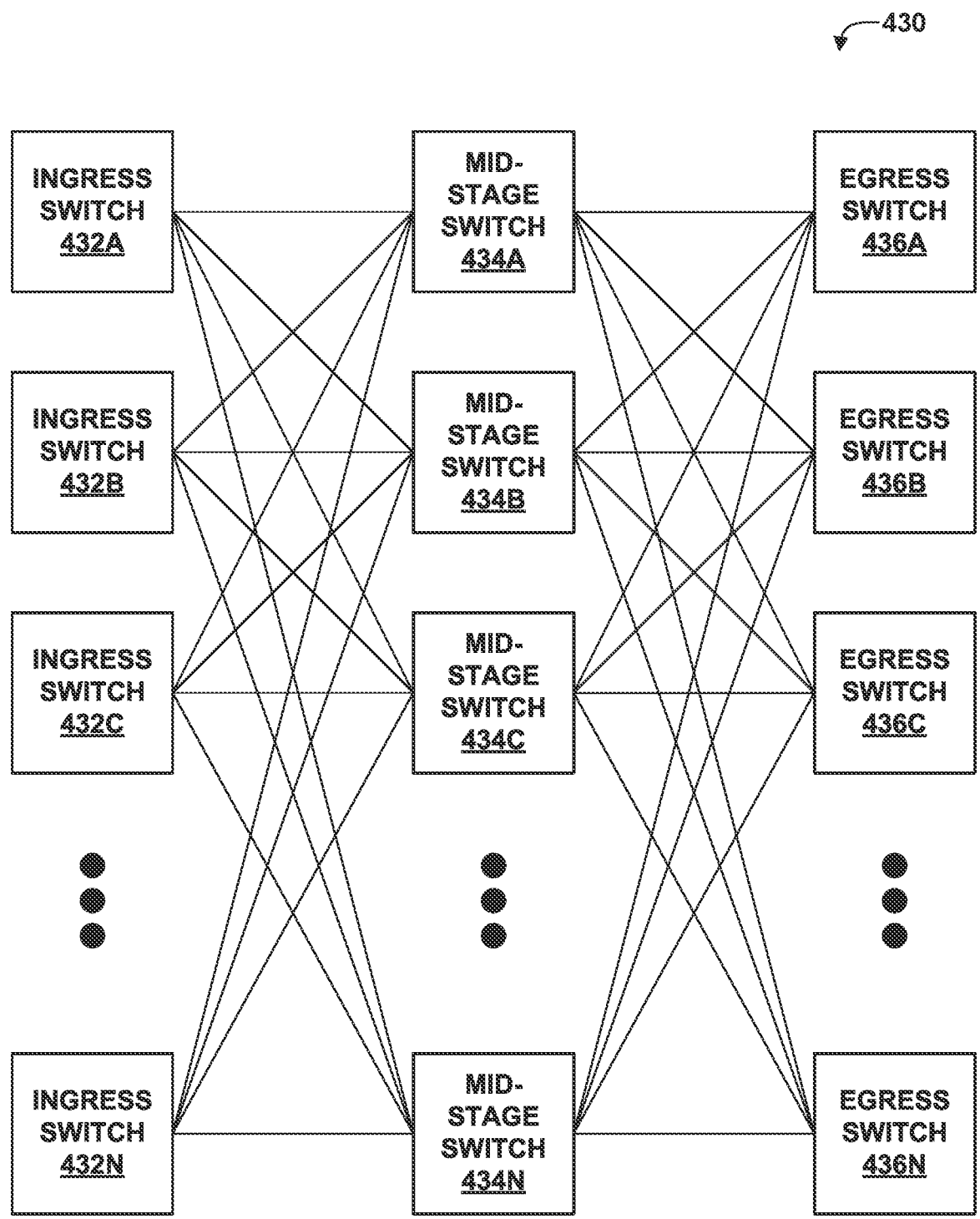
FIG. 7 is a block diagram illustrating an example Clos network.

FIG. 7 is a block diagram illustrating an example Clos network 430. Clos network 430 includes three stages of switches: ingress switches 432A-432N (ingress switches 432), mid-stage switches 434A-434N (mid-stage switches 434), and egress switches 436A-436N (egress switches 436). Although the letter "N" is used to designate a variable number for each of ingress switches 432, mid-stage switches 434, and egress switches 436, the number of switches included in each stage is not necessarily the same. That is, there may be different numbers of ingress switches 432, mid-stage switches 434, and egress switches 436.

Furthermore, although Clos network 430 includes three stages, a general Clos network may include any number of stages (e.g., a 5-stage Clos network or another stage Clos network).

Figure 8:
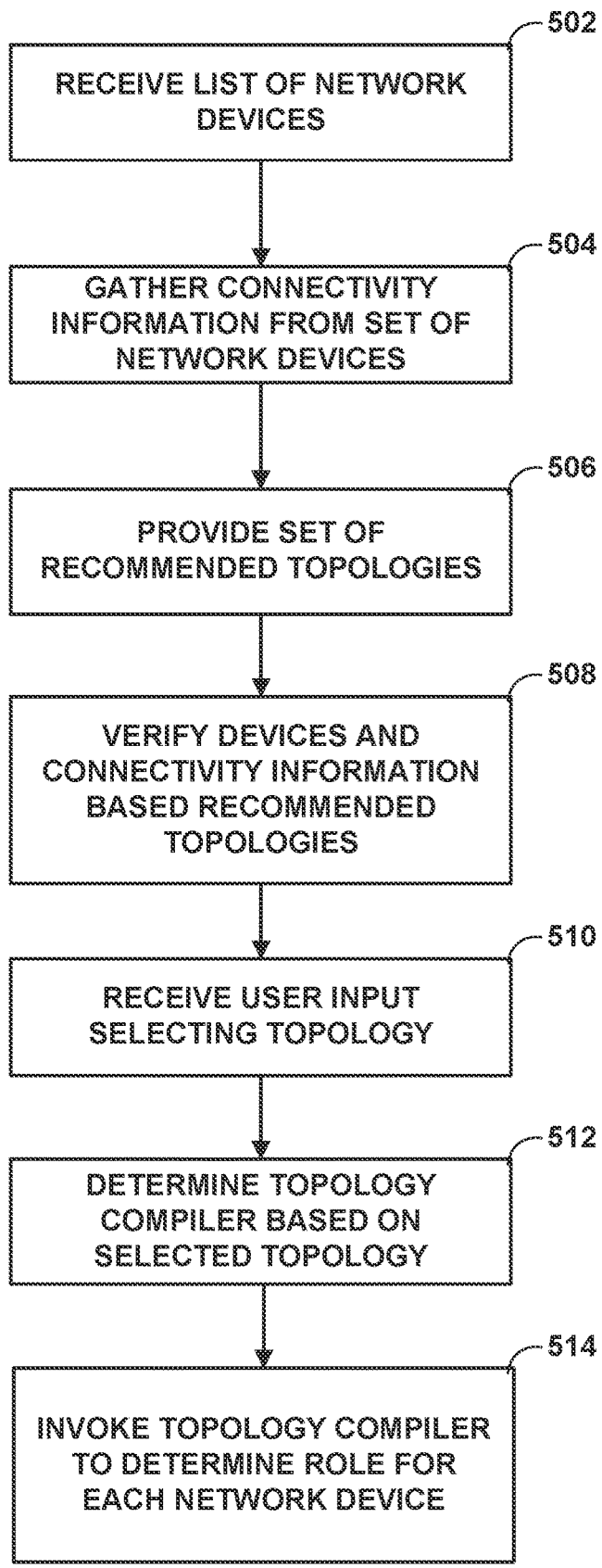
FIG. 8 is a flowchart illustrating an example process for determining a role for a network device using a topology compiler according to techniques of this disclosure.

FIG. 8 is a flowchart illustrating an example process for determining a role for a network device using a topology compiler according to techniques of this disclosure. In some examples, the process illustrated in FIG. 8 may represent a "day 0" operation. Controller device 10 may receive a list of network devices (502). For example, controller device 10 may receive a list of elements 14 of FIG. 1. Controller device 10 may gather connectivity information from a set of network devices (504). For example, controller device 10 may gather cabling information from one or more of elements 14.

Controller device 10 may provide a set of recommended topologies (506). For example, controller device 10 may recommend a leaf and spine network topology in response to determining that connectivity information indicates that elements 14 are arranged in a leaf and spine network topology. Controller device 10 may verify devices and connectivity information based on recommended topology architectures (508). For example, controller device 10 may verify that cabling provides links to support the recommended topology. Controller device 10 may receive user input selecting a topology (510). For example, controller device 10 may receive a user input selecting a topology from a plurality of recommended topologies. In some examples, controller device 10 may receive a user input confirming an instruction to implement a single recommended topology.

Controller device 10 may determine a topology compiler based on the selected topology (512). For example, controller device 10 may select a topology compiler associated (e.g., assigned) to the selected topology from a plurality of topology compilers that are each associated with a respective topology. Controller device 10 may invoke the topology compiler to determine a role for each network device (514). For example, controller device 10, when executing the topology compiler, may determine a spine role to element 14A and a leaf role to element 14B.

Figure 9:
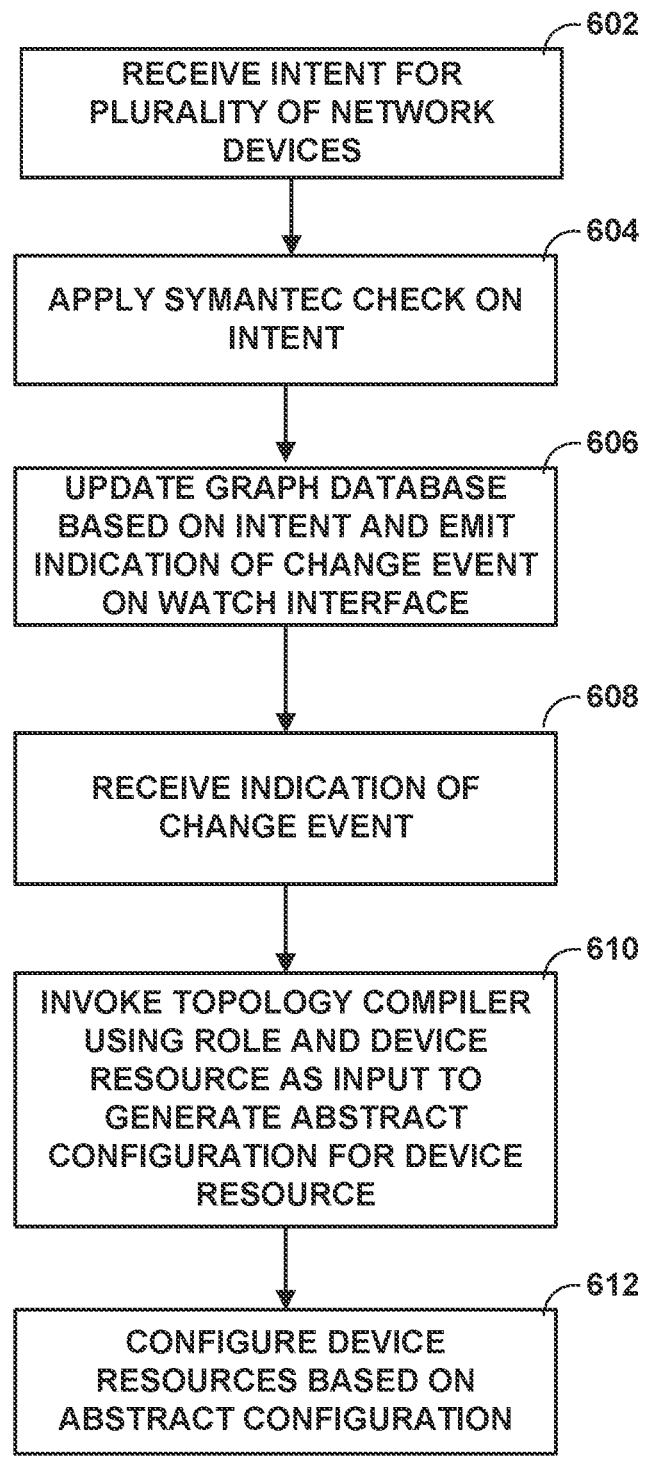
FIG. 9 is a flowchart illustrating an example process for generating an abstract configuration using a topology compiler according to techniques of this disclosure.

FIG. 9 is a flowchart illustrating an example process for generating an abstract configuration using a topology compiler according to techniques of this disclosure. In some examples, the process illustrated in FIG. 9 may represent a "day 1+" operation. Controller device 10 may receive an intent for a plurality of network devices (602). For example, controller device 10 may receive an intent from administrator 12. Controller device 10 may apply a Symantec check on the intent (604). Controller device 10 may update graph database 370 based on the intent and emit an indication of a change event on watch 305 (606).

Resource controller 372A may receive an indication of an event (608) and invoke a topology compiler using a role and device resource as input to generate an abstract configuration for the device resource (610). For example, resource controller 372A may determine a topology compiler from topology compilers 310 based on the change event. For example, resource controller 372A may determine topology compiler 310A is associated with the change event based on a portion of a data structure stored by graph database 370. In this example, resource controller 372A may invoke, with API 304, topology compiler 310A using a role of element 14A and an indication of element 14A as input to generate abstract configuration information. In this example, topology compiler 310, when executed by processing circuitry (e.g., processing circuitry of controller device 10), may output the abstract configuration information to resource controller 372A.

Resource controller 372A may configure element 14A based on the abstract configuration (612). Resource controller 372A may configure element 14A based on the abstract configuration. In some examples, resource controller 372A may output the abstract configuration to the device manager and may receive a device-level configuration. In some examples, resource controller 372A may determine the device based on the abstract configuration.

Figure 10:
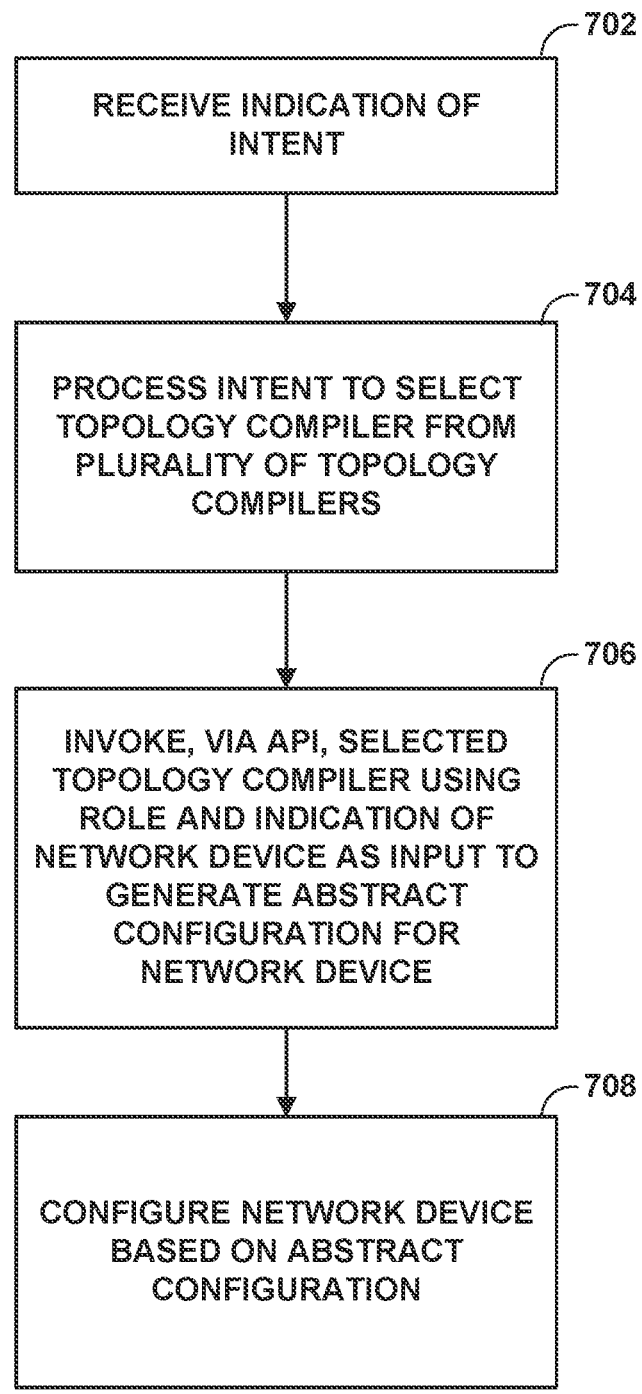
FIG. 10 is a flowchart illustrating an example process for configuring a device resource using a topology compiler according to techniques of this disclosure.

FIG. 10 is a flowchart illustrating an example process for configuring a device resource using a topology compiler according to techniques of this disclosure. Controller device 10 may receive an indication of an intent (702). For example, controller device 10 may receive the intent from administrator 12. The intent may include data indicating an update to a data structure including a plurality of nodes representing a plurality of network devices (e.g., elements 14) and a plurality of edges connecting the plurality of nodes. In some examples, the data structure may comprise a graph model. The plurality of edges may define relationships between the plurality of nodes.

Controller device 10 may process the intent to select a topology compiler from a plurality of topology compilers (704). For example, controller device 10 may select a topology of a plurality of topologies for the elements 14 based on the intent and connectivity information of elements 14. In this example, controller device 10 may select the topology compiler that is associated with (e.g., assigned to) the selected topology. In some examples, each topology compiler of topology compilers 310 is associated with a respective topology of a plurality of topologies. For instance, topology compiler 310A may be assigned to a first topology, topology compiler 310B may be assigned to a second topology, and so on. The plurality of topologies may comprise one or more of a 3-stage Clos network topology, a 5-stage Clos network topology, or a spine and leaf topology. In some examples, each topology compiler of the topology compilers comprises a binary executable by controller device 10.

Each topology compiler of the plurality of topology compilers may comprise a pluggable compiler configured to conform to a standard invocable by the API framework. For example, each of the topology compilers 310 may comprise a pluggable topology compiler configured to conform to a standard invocable by API 304. For instance, API 304 may comprise a set of communication standards for providing intent information to topology compilers 310 and may comprise a set of communication standards for receiving an abstract configuration.

Controller device 10 may invoke, via the API, the selected topology compiler using a role of the network device and an indication of the network device as input to generate abstract configuration information (706). For example, resource controller 372A may invoke, with API 304, topology compiler 310A using a role of network device 14A and an indication of network device 14A as input and topology compiler 310A, when executed by controller device 10, generates the abstract configuration information. Controller device 10 may configure the network device based on the abstract configuration information (708). For example, resource controller 372A may output the abstract configuration to a device manager and may receive a device-level configuration. In this example, resource controller 372A may configure element 14A with the device-level configuration received from the device manager. In some examples, resource controller 372A may determine the device based on the abstract configuration and configure element 14A with the device-level configuration determined by resource controller 372A.

In some examples, controller device 10 may determine the role of a network device. For example, controller device 10 may receive an indication of a plurality of network devices (e.g., elements 14). In this example, controller device 10 may determine connectivity information (e.g., cabling information) for the plurality of devices. Controller device 10 may select a topology for the plurality of network devices based on the connectivity information. The topology compiler (e.g., topology compiler 310A) may be associated with the selected topology. Controller device 10 may invoke, via the API framework (e.g., API 304), the topology compiler using the connectivity information as input to determine the role of the network device. In some examples, invoking the topology compiler to determine the role of the network device is in response to a user interaction indicating a confirmation of the selected topology.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method comprising:
receiving, by a controller device that manages a plurality of network devices, via an application programming interface (API) framework, an indication of an intent, wherein the intent includes data indicating an update to a data structure including a plurality of nodes representing the plurality of network devices and a plurality of edges connecting the plurality of nodes;
processing, by the controller device, the intent to select, from a plurality of topology compilers, a topology compiler configured to generate abstract configuration information for each role of a plurality of roles of a topology assigned to the topology compiler, wherein each topology compiler of the plurality of topology compilers comprises a pluggable compiler configured to conform to a standard invocable by the API framework that comprises a first set of communication standards for providing intent information to the plurality of topology compilers and that comprises a second set of communication standards for receiving the abstract configuration information;
invoking, by the controller device, via the API framework, the selected topology compiler with an input indicating both a role of a network device of the plurality of network devices and the network device to cause the selected topology compiler to generate the abstract configuration information; and
configuring, by the controller device, the network device based on the abstract configuration information.

2. The method of claim 1, further comprising:
receiving, by the controller device, an indication of the plurality of network devices;
determining, by the controller device, connectivity information for the plurality of devices;
selecting, by the controller device, a topology for the plurality of network devices based on the connectivity information, wherein the selected topology compiler is associated with the selected topology; and
invoking, by the controller device, via the API framework, the selected topology compiler using the connectivity information as input to determine the role of the network device.

3. The method of claim 2, wherein invoking the selected topology compiler to determine the role of the network device is in response to a user interaction indicating a confirmation of the selected topology.

4. The method of claim 1, wherein configuring the network device comprises determining a device-level configuration for the network device based on the abstract configuration and outputting an indication of the device-level configuration to the network device.

5. The method of claim 1, wherein each topology compiler of the plurality of topology compilers is associated with a respective topology of a plurality of topologies.

6. The method of claim 5, wherein the plurality of topologies comprises one or more of a 3-stage Clos network topology, a 5-stage Clos network topology, or a spine and leaf topology.

7. The method of claim 1, wherein the plurality of edges define relationships between the plurality of nodes.

8. The method of claim 1, wherein the data structure comprises a graph model.

9. The method of claim 1, wherein each topology compiler of the plurality of topology compilers comprises a binary executable by the controller device.

10. The method of claim 1, wherein the network device comprises one or more of a resource device or a service device.

11. The method of claim 1,
wherein the plurality of roles comprises a spine role and a leaf role; and
wherein invoking the selected topology comprises invoking the topology compiler with the input indicating one of the spine role or the leaf role.

12. A controller device that manages a plurality of network devices, the controller device comprising one or more processing units implemented in circuitry and configured to:
receive, via an application programming interface (API) framework, an indication of an intent, wherein the intent includes data indicating an update to a data structure including a plurality of nodes representing the plurality of network devices and a plurality of edges connecting the plurality of nodes;
process the intent to select, from a plurality of topology compilers, a topology compiler configured to generate abstract configuration information for each role of a plurality of roles of a topology assigned to the topology compiler, wherein each topology compiler of the plurality of topology compilers comprises a pluggable compiler configured to conform to a standard invocable by the API framework that comprises a first set of communication standards for providing intent information to the plurality of topology compilers and that comprises a second set of communication standards for receiving abstract configuration information;

invoke, via the API framework, the selected topology compiler with an input indicating both a role of a network device of the plurality of network devices and the network device to cause the selected topology compiler to generate abstract configuration information; and configure the network device based on the abstract configuration information.

13. The controller device of claim 12, wherein the one or more processing units are further configured to:

receive an indication of the plurality of network devices;

determine connectivity information for the plurality of devices;

select a topology for the plurality of network devices based on the connectivity information, wherein the selected topology compiler is associated with the selected topology; and invoke, via the API framework, the selected topology compiler using the connectivity information as input to determine the role of the network device.

14. The controller device of claim 13, wherein the one or more processing units are configured to invoke the selected topology compiler to determine the role of the network device in response to a user interaction indicating a confirmation of the selected topology.

15. The controller device of claim 12, wherein, to configure the network device, the one or more processing units are configured to determine a device-level configuration for the network device based on the abstract configuration and output an indication of the device-level configuration to the network device.

16. The controller device of claim 12, wherein each topology compiler of the plurality of topology compilers is associated with a respective topology of a plurality of topologies.

17. The controller device of claim 16, wherein the plurality of topologies comprises one or more of a 3-stage Clos network topology, a 5-stage Clos network topology, or a spine and leaf topology.

18. The controller device of claim 12, wherein the plurality of edges define relationships between the plurality of nodes.

19. The controller device of claim 12, wherein the plurality of roles comprises a spine role and a leaf role; and wherein, to invoke the selected topology, the one or more processing units are configured to invoke the topology compiler with the input indicating one of the spine role or the leaf role.

20. A non-transitory computer-readable storage medium having stored thereon instructions that, when executed, cause a processor of a controller device that manages a plurality of network devices to:

receive, via an application programming interface (API) framework, an indication of an intent, wherein the intent includes data indicating an update to a data structure including a plurality of nodes representing the plurality of network devices and a plurality of edges connecting the plurality of nodes;

process the intent to select, from a plurality of topology compilers, a topology compiler configured to generate abstract configuration information for each role of a plurality of roles of a topology assigned to the topology compiler, wherein each topology compiler of the plurality of topology compilers comprises a pluggable compiler configured to conform to a standard invocable by the API framework that comprises a first set of communication standards for providing intent information to the plurality of topology compilers and that comprises a second set of communication standards for receiving abstract configuration information;

invoke, via the API framework, the selected topology compiler with an input indicating both a role of a network device of the plurality of network devices and the network device to cause the selected topology compiler to generate abstract configuration information; and configure the network device based on the abstract configuration information.

* * * * *